United States Patent [19]

Nagano

[11] Patent Number: 4,532,825
[45] Date of Patent: Aug. 6, 1985

[54] CONTROL DEVICE FOR A TWO STAGE DERAILLEUR

[75] Inventor: Masashi Nagano, Izumi, Japan

[73] Assignee: Shimano Industrial Company Limited, Osaka, Japan

[21] Appl. No.: 385,126

[22] Filed: Jun. 4, 1982

[30] Foreign Application Priority Data

Jun. 15, 1981 [JP] Japan .............................. 56-88520[U]

[51] Int. Cl.³ ............................ G05G 5/06; F16C 1/10
[52] U.S. Cl. ........................................ 74/532; 74/489; 74/501 R
[58] Field of Search ................. 74/532, 475, 487, 489, 74/501 R

[56] References Cited

U.S. PATENT DOCUMENTS

| | | | |
|---|---|---|---|
| 2,498,246 | 2/1950 | Buckel | 74/532 X |
| 3,633,437 | 1/1972 | Ishida . | |
| 3,808,907 | 5/1974 | Yamaguchi . | |
| 3,845,847 | 11/1974 | Camp | 74/489 X |
| 4,319,673 | 3/1982 | Kojima | 74/489 X |

FOREIGN PATENT DOCUMENTS

| | | |
|---|---|---|
| 705129 | 6/1931 | France . |
| 53-126649 | 11/1978 | Japan . |
| 185021 | 1/1937 | Switzerland . |
| 2033062 | 5/1980 | United Kingdom . |

Primary Examiner—Kenneth J. Dorner
Attorney, Agent, or Firm—Stevens, Davis, Miller & Mosher

[57] ABSTRACT

A control device for a two stage derailleur comprising a control lever supported swingably around a first lever shaft between first and second speed change positions and which is biased always toward the first speed change position, and a release lever which holds the control lever in the second speed change position and which is operable to release the control lever. The release lever is supported to a second lever shaft perpendicular to the first lever shaft to thereby allow the control lever and release lever to operate perpendicularly to each other.

8 Claims, 8 Drawing Figures

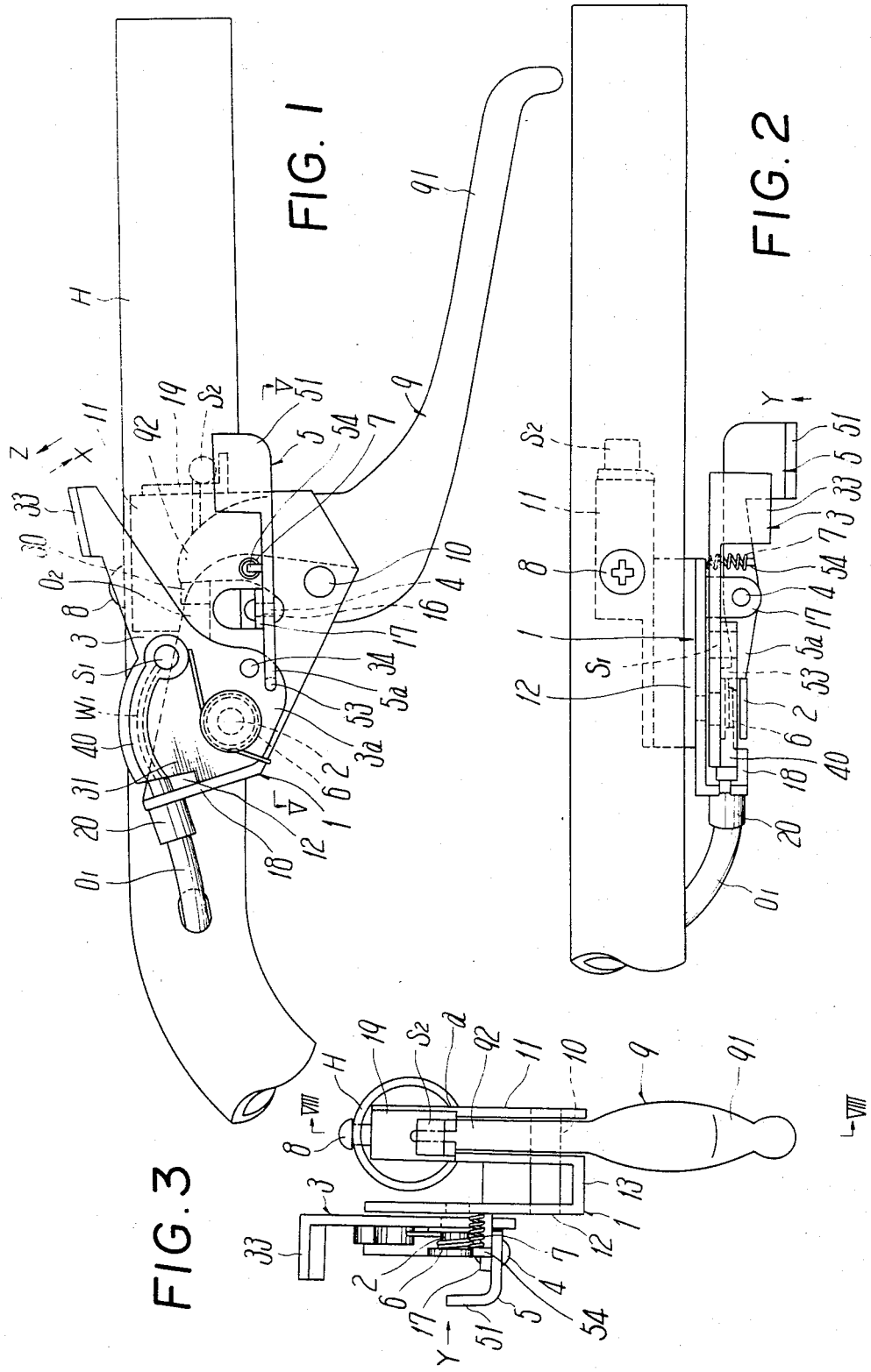

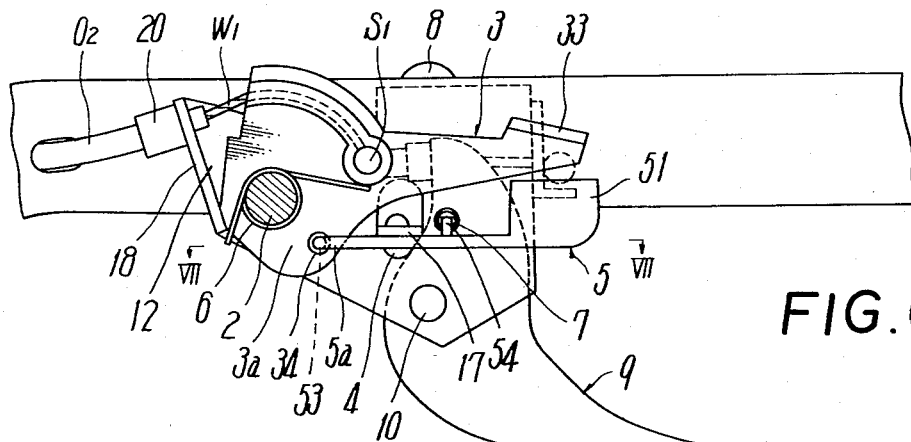
FIG. 6
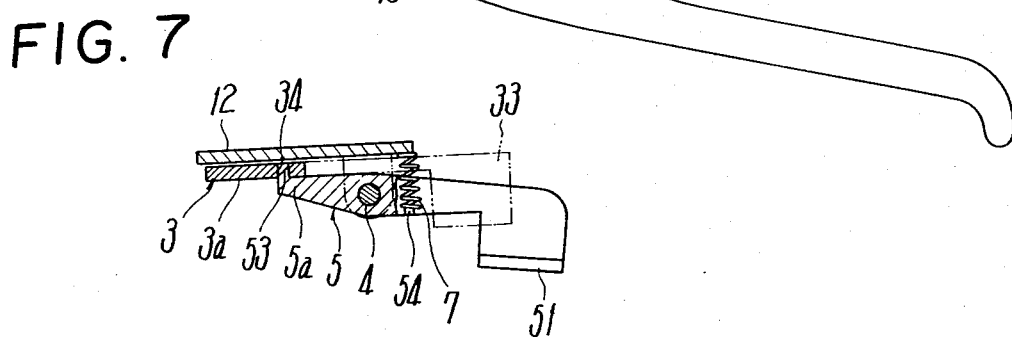
FIG. 7
FIG. 8
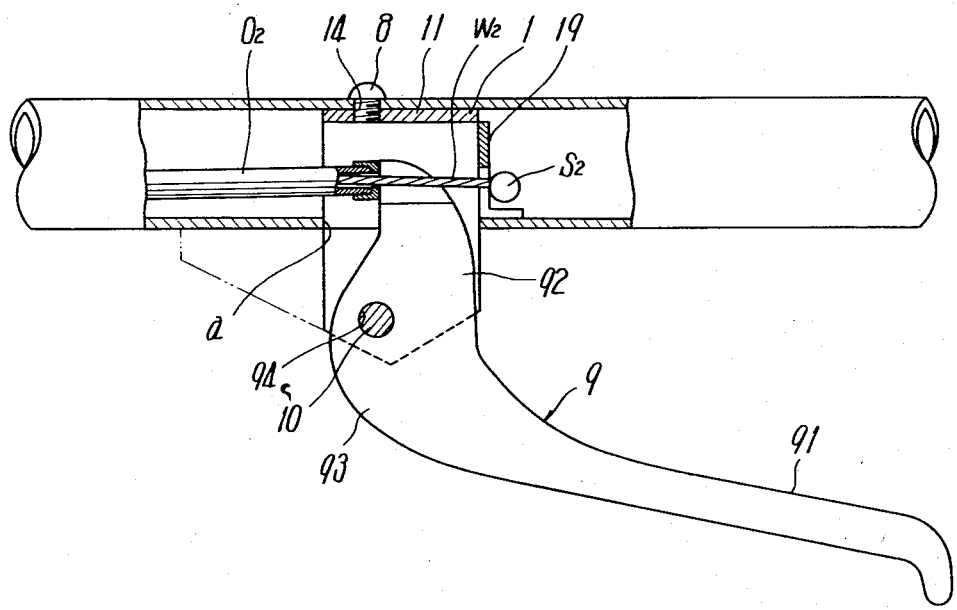

CONTROL DEVICE FOR A TWO STAGE DERAILLEUR

FIELD OF THE INVENTION

This invention relates to a control device used mainly for a bicycle to control a two-stage derailleur by a control wire, and more particularly to a control device for a two stage derailleur, which supports a control lever swingably through a lever shaft to a fixing member fixed mainly at the bicycle frame so that the control lever is operated to shift a changeover member at the two-stage derailleur, for example, from a first speed change position corresponding to a high speed stage to a second speed change position corresponding to a low speed stage through a control wire stretched between the control lever and an actuating member at the derailleur.

BACKGROUND OF THE INVENTION

Conventionally, this kind of control device, as well-known, has a pair of first and second control levers supported swingably through one horizontal lever shaft at both sides of a plate-like fixing member fixed to the bicycle frame, a control wire is secured at one end to the first control lever, and a retaining mechanism, which positions the first control lever and holds it at its operated position and releases the second control lever, is provided between the respective levers and the fixing member so that, when the first lever swings in the direction of pulling the wire, the second lever swings in the direction of loosening the wire by a return spring, and, when the second lever swings in the direction of pulling the wire, the first lever swings to loosen the wire by a virtue of a return spring at the derailleur, thereby performing the two stage speed change.

This type of control device, however, may be operated improperly and malfunction because the two levers operating in the same direction and also it creates a problem in that a cyclist's finger operating one lever may to be hit by the other which springs back by action of the return spring.

SUMMARY OF THE INVENTION

An object of the invention is to provide a control device for a two stage derailleur, which can operate a control lever and a release lever each in one direction to switch the derailleur between high and low speed stages without causing a malfunction, and return the control lever from the second speed change position to the first speed change position by virtue of a restoring force of a biasing means without fear of hitting the cyclist's finger which is operating the release lever for releasing the control lever held therewith at the second speed change position.

This invention is characterized in that: the control lever for controlling the two stage derailleur is displaceable between the first and second speed change stages and is biased always toward the first speed change stage by a first biasing means; and in that a release lever which is provided independently of the control lever, is biased at the utmost end to move always toward the control lever by a second biasing means so as to hold the control lever at the second speed change position against the first biasing means, is operable to release the control lever and return it to the first speed change position, and is supported to a second lever shaft approximately perpendicular to a first lever shaft supporting the control lever to thereby allow the control lever and release lever to swing perpendicularly to each other.

The control lever is provided with a retaining means which retains one end of the control wire connected at the other end to the two stage derailleur, and is shifted to pull or loosen the wire to switch the derailleur to the high speed stage or the low speed stage.

Also, the control lever is shifted against the first biasing means from the first speed change position to the second is speed change position and held thereat by the release lever through a holding means provided between the release lever and the control lever.

On the contrary, the release lever is operated to release the control lever from the second speed change position so that the control lever automatically returns therefrom to the first speed change position by virtue of a restoring force of the first biasing means.

In brief, the control lever is operated to shift in one direction and the release lever is shifted in one direction to return the control lever, thereby switching the derailleur from the high speed stage to the low speed stage and vice versa. As a result, the bicycle speed is changeable easily and quickly.

Furthermore, the control lever and release lever are operable approximately perpendicularly to each other for changing the speed to thereby eliminate a malfunction and prevent the cyclist from being hit at his finger on one lever by the other lever which springs back by the biasing means.

The control device of the invention is used mainly for a bicycle and is mounted on its handle bar near a grip thereof. Therefore, it is preferable that the first lever shaft for the control lever extends horizontally to allow the control lever to vertically swing and the second lever shaft to the release lever extends vertically to swing the release lever horizontally, because the cyclist uses the thumb of his hand gripping the handle grip to not-forcibly operate the control lever and release lever.

These and other objects of the invention will become more apparent in the detailed description and examples which follow.

BRIEF DESCRIPTION OF THE DRAWINGS

FIG. 1 is a front view of an embodiment of a control device of the invention,

FIG. 2 is a plan view of the FIG. 1 embodiment,

FIG. 3 is a side view of the same,

FIG. 6 is a front view of the FIG. 1 embodiment, showing a control lever in condition of being operated, FIG. 7 is a sectional view taken on the line VII—VII in FIG. 6, and FIG. 8 is a sectional view taken on the line VIII—VIII in FIG. 3.

DETAILED DESCRIPTION OF THE INVENTION

Figure 5:
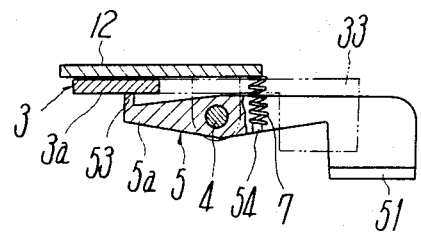
FIG. 5 is a sectional view taken on the line V—V in FIG. 1.

A control device shown in the drawings is mounted on a handle bar H in the vicinity of its grip. A fixing member 1 is fixed near the grip and has a first lever shaft 2 extending horizontally and a second lever shaft 4 having an axis approximately perpendicular to the axis of first lever shaft 2, the first lever shaft 2 supporting a control lever 3 in relation of being displaceable to a first speed change position shown in FIG. 1 and a second speed change position shown in FIG. 6, the second lever shaft 4 supporting a release lever 5 swingably away from or toward the control lever 3 as shown in FIGS. 5 and 7. A first biasing means 6 for biasing the control lever 3 to the first speed change position is interposed between the fixing member 1 and the control lever 3, and a second biasing means 7 for biasing the release lever 5 at its utmost end toward the control lever 3 is interposed between the fixing member 1 and the release lever 5. A holding means is provided between the control lever 3 and the release lever 5, which holds the control lever 3 at the second speed change position where it is shifted against the first biasing means 6. The release lever 5 swings against the second biasing means 7 to release the holding means and return the control lever 3 automatically by virtue of a restoring force of first biasing means 6.

Figure 4:
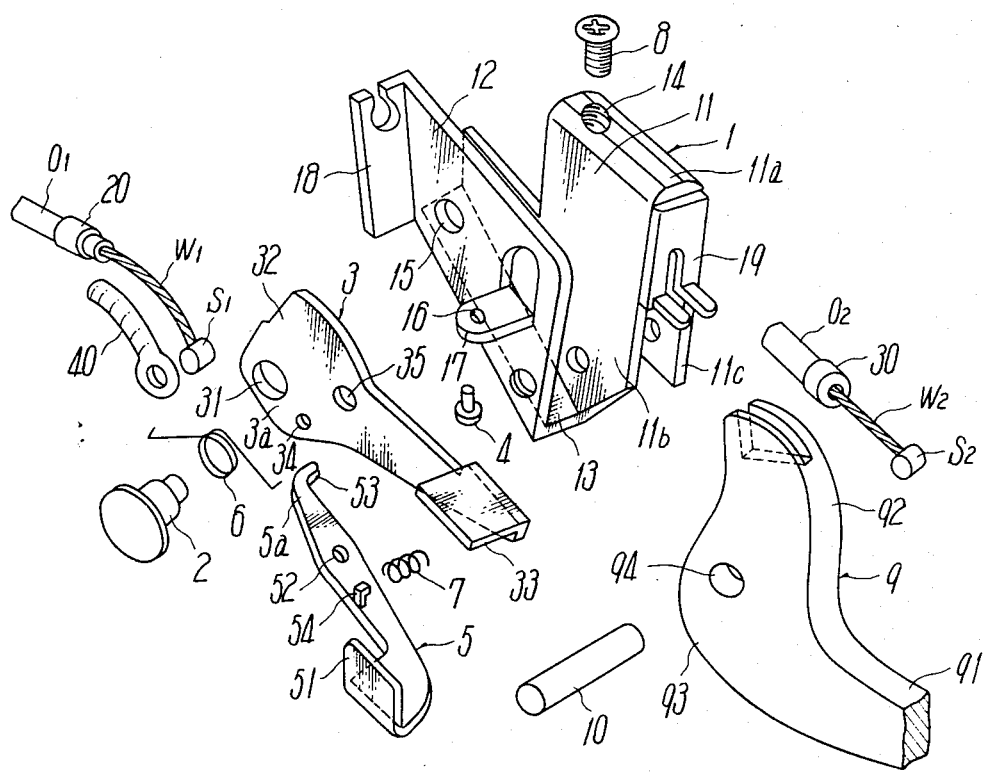
FIG. 4 is a perspective exploded view of the same.

The fixing member 1, as shown in FIG. 4, is formed of a bent metallic plate and comprises a fixing portion 11 of an inversed-U-like shape in section which is inserted vertically into the handle bar H through a lower cutout a thereof, a horizontal connecting portion 13, and a lever support portion 12 extending vertically from the connecting portion 13, the fixing portion 11 being fixed to the handle bar by a screw 8 screwed with a threaded bore 14 formed at the upper wall of fixing portion 11, the lever support portion 12 having a shaft bore 15 at the vertical surface and a shaft bore 16 at a support tongue 17 horizontally projecting from the vertical surface so that the first and second lever shafts 2 and 4 are inserted into the shaft bores 15 and 16 respectively, and also having a regulatory portion 18 for setting the control lever 3 in the first speed change position.

The control lever 3, as shown in FIG. 4, comprises a boss 32 having a shaft bore 31 for the first lever shaft 2 and a control portion 33 bent at a right angle from the boss 32, and is operated by the control portion 33 to be shiftable in vertically swinging motion through the first lever shaft 2 between the first speed change position in FIG. 1 and the second position in FIG. 6, thereby switching the derailleur to the high speed stage from the low speed stage and vice versa.

Also, the control lever 3 provides a recess 34 forming a holding means to be discussed below and a retaining means formed as a bore 35 into which an end piece $S_1$ of control wire $W_1$ is inserted.

In addition, reference numeral 40 in FIG. 4 designates a wire guide of C-shape in section and having a guide groove for guiding the wire $W_1$ and fixed to the outer surface 3a of control lever 3.

The release lever 5 is formed of an elongate metallic plate and has at one end a control portion 51, at a lengthwise intermediate portion a shaft bore 52 for the second lever shaft 4, and at the utmost end 5a an engaging projection 53, the shaft bore 52 being fitted onto the second lever shaft 4 to thereby support the release lever 5 vertically swingably, the engaging projection 53, together with the engaging recess 34 at the control lever 3, constituting a holding means as shown, through which the release lever 5 holds the control lever 3 at the second speed change position or releases the lever 3 therefrom.

In detail, the control lever 3 swings against the first biasing means 6 toward the second speed change position and is held thereat by the projection 53 engaging with the recess 34 by virtue of a spring force of the second biasing means 7. The release lever 5 is operated by the control portion 51 to swing at its utmost end away from the control lever 3 against the second biasing means 7 and the projection 53 disengages from the recess 34 to thereby release the control lever 3 and return it to the first speed change position by virtue of the restoring force of first biasing means 6.

The first biasing means 6 mainly uses a spring wire coiled at its intermediate portion, is supported at the coiled portion to the first lever shaft 2, and engages at one end with the lower portion of support portion 12 at the fixing member 1 and at the other end with the control lever 3, thereby biasing the control lever 3 to always contact the regulatory portion 18 and in the direction of loosening the wire $W_1$.

The second biasing means 7 mainly comprises a coiled spring interposed between the lever support portion 12 and a spring seat 54 projecting from the release lever 5 between the shaft bore 52 and the control portion 51, thereby biasing the utmost end 5a of release lever 5 toward the outer surface 3a of control lever 3.

Also, the fixing portion 11 of fixing member 1, as shown in FIG. 4, is box-like shaped, carries, between its side walls 11b and 11c, a brake lever 9 vertically swingably through a pin 10 parallel to the first lever shaft 2, and has a bent wire-retainer 19 extending across the side walls 11b and 11c. In addition, the regulatory portion 18 supports an outer stop 20 of an outer sheath $O_1$ guiding the wire $W_1$.

The brake lever 9, as shown in FIGS. 1 and 4, comprises an elongate control portion 91 and a support portion 92 bent at a right angle from one lengthwise end of the control portion 91, the bent portion 93 providing a pin hole 94 into which the support pin 10 is fitted to support the brake lever 9 vertically swingably, the support portion 92 entering into the handle bar H and supporting an outer stop 30 at an outer sheath $O_2$ guiding a brake operating wire $W_2$. In addition, an end piece $S_2$ of wire $W_2$ is retained to the wire-retainer 19, the brake operating wire $W_2$ and outer sheath $O_2$ being accommodated within the handle bar H.

The brake lever 9 need not be mounted on the fixing member 1, but a fixing member for the brake lever 9 only and a mounting means for the fixing means, can be separately provided thereby simplifying the brake lever mounting construction.

The fixing member 1 may also be fixed to the handle bar H by use of a band means, or may be provided with a cover covering the bases of control lever 3 and release lever 5, the cover having a window through which a display panel provided at the control lever 3 for displaying each speed change stage is made visible, or having marks to be pointed to by a pointer attached to the control lever 3.

The control device of the invention is used together with the two stage derailleur mainly for a mini-bicycle or a motocross bicycle. FIG. 1 shows the control lever 3 at the first speed change position where the derailleur is switched to the high speed stage.

Next, explanation will be given on the operation of the control device.

When the control lever 3 in FIG. 1 swings against the first biasing means 6 and vertically downwardly (in the direction of the arrow X in FIG. 1), in turn, in the direction of pulling the control wire $W_1$, the derailleur is switched to the low speed stage and the engaging projection 53 at the release lever 5 engages with the engaging recess 34 at the control lever3 as shown in FIGS. 6 and 7 to hold the control lever 3 at the second speed change position, thereby maintaining the changeover member of the derailleur at the low speed stage. In this instance, when the recess 34 is formed as a through bore, the projection 53 passes at its tip through the through bore and abuts against the support portion 12 at the fixing member 1 to generate a sound, whereby the cyclist can make sure that the speedchange has occurred. The cyclist also obtains a clicking feeling by operation of control lever 3.

Next, when the derailleur is returned to the high speed stage, the release lever 5 in FIG. 6 swings against the second biasing means 7 and horizontally unidirectionally (in the direction of the arrow Y in FIG. 2 or 3) to disengage the projection 53 from the recess 34, whereby the control lever 3 is released to return vertically upwardly (in the direction of the arrow Z), and in turn, in the direction of loosening the wire $W_1$, automatically by virtue of the spring force of the first biasing means 6, and then stops in contact with the regulatory portion 18.

Since the control lever 3 and release lever 5 have different swinging directions, a malfunction during the changing the bicycle speed can be avoided and the cyclist will not be hit at his finger which is operating the release lever 5 by movement of the control lever 3 as it springs back.

As seen from the embodiment, the fixing portion 11 of fixing member 1 fixed within the handle bar H can locate the control portions 33 and 51 of control lever 3 and release lever 5 so they are easily operated and both levers 3 and 5 are positioned inwardly of handle bar H where they cannot catch the cyclist's clothes and where they will not break when the bicycle falls down.

As an alternative arrangement, the control lever 3 and release lever 5 may be made swingable reversely to the directions described above, that is, the former may swing horizontally and the latter vertically, or the control lever 3 may be made swingable in the direction of loosening the wire $W_1$ to thereby change the speed.

Also, a return spring, when provided at the derailleur, may serve as the first biasing means 6.

The release lever 5 alternatively may be formed, for example, of a flexible leaf spring or a synthetic resin plate so that the utmost end of release lever 5, instead of using the second biasing means 7, may be biased toward the outer surface 3a of control lever 3.

Also, the engaging recess 34 alternatively may be provided at the release lever 4 and the engaging projection 53 at the control lever 3, or the engaging recess 34 may be formed in a slit instead of the through bore shown in the drawing.

While an embodiment of the invention has been shown and described, the invention is not limited to the specific construction thereof, which is merely exemplary rather than limiting the invention.

What is claimed is:

1. A control device for controlling a two stage derailleur through a control wire, comprising:
   a fixing member supporting a first lever shaft and a second lever shaft, the second lever shaft having an axis substantially perpendicular to that of said first lever shaft, said fixing member having a fixing portion and a lever supporting portion, said lever supporting portion having a first supporting surface for supporting said first lever shaft and a support extending perpendicularly to said first supporting surface and having a second supporting surface for supporting said second lever shaft, so that said first lever shaft is supported to said first supporting surface and said second lever shaft is supported to said second supporting surface;
   a control lever supported swingably to said first lever shaft, being displaceable between a first and a second speed change position corresponding to speed change positions of said derailleur, and having a retaining means for retaining one end of said control wire;
   a release lever supported swingably to said second lever shaft at said fixing member and displaceable at an utmost end thereof away from or toward said control lever;
   a first biasing means for biasing said control lever always toward said first speed change position;
   a second biasing means for biasing said release lever at an utmost end thereof always in the direction of approaching said control lever; and
   a holding means provided at said control lever and at the utmost end of said release lever for holding said control lever at said second speed change position against said first biasing means through said release lever.

2. A control device according to claim 1, wherein said first lever shaft extends horizontally and said second lever shaft extends vertically so that said control lever vertically swings and said release lever horizontally swings.

3. A control device according to claim 1 or 2, wherein said fixing member has a regulatory portion for setting said first speed change position of said control lever.

4. A control device according to claim 1, wherein said first supporting surface is a vertical surface and said second supporting surface is a horizontal surface, so that said first lever shaft is supported horizontally to said vertical surface and said second lever shaft is supported vertically to said horizontal surface.

5. A control device according to claim 1, wherein said holding means comprises an engaging recess an engaging projection engageable therewith, said recess being provided at one of a wall surface of said control lever and the utmost end of said release lever, said engaging projection being provided at the other.

6. A control device according to claim 1, wherein a brake lever is supported swingably to said fixing member.

7. A control device which controls through a control wire a two stage derailleur mounted on a bicycle and which is fixed for use in the vicinity of a grip at a handle of the bicycle, comprising:
   a fixing member fixed in the vicinity of a grip at a handle of a bicycle and having a fixing portion fixed to said handle and a lever supporting portion, said lever supporting portion having a first lever shaft extending horizontally and a second lever shaft having an axis substantially perpendicular to that of said first lever shaft;
   a control lever displaceable between a first and a second speed change position corresponding to speed change positions of said derailleur and having a retaining means for retaining an end of said control wire;
   a release lever supported swingably to said second lever shaft at said fixing member and displaceable at an utmost end thereof from or toward said control lever;

a first biasing means for biasing said control lever always toward said first speed change position;

a second biasing means for biasing said release lever at an utmost end thereof always in the direction of approaching said control lever; and a holding means provided at said control lever and at the utmost end of said release lever for holding said control lever at said second speed change position against said first biasing means through said release lever;

said fixing portion at said fixing member having an inverted U-like shape in section and being insertable into a cutout provided at said handle in the vicinity of the grip thereof, said fixing portion having at an upper wall thereof a threaded bore and being fixed to said handle in the vicinity of the grip thereof through a screw means.

8. A control device according to claim 7, wherein said fixing portion at said fixing member has a support pin between side walls at said fixing portion so that a brake lever is supported swingably between said side walls through said pin.

* * * * *